US011882338B2

(12) United States Patent
Mizuta et al.

(10) Patent No.: US 11,882,338 B2
(45) Date of Patent: Jan. 23, 2024

(54) SYSTEM, METHOD, AND COMPUTER-READABLE MEDIUM INCLUDING PROGRAM FOR DISTRIBUTING LIVE VIDEO

(71) Applicant: DeNA Co., Ltd., Tokyo (JP)

(72) Inventors: Daisuke Mizuta, Tokyo (JP); Mari Kurihara, Tokyo (JP); Tomoya Hirano, Tokyo (JP); Eri Matsuda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 17/320,877

(22) Filed: May 14, 2021

(65) Prior Publication Data

US 2021/0274259 A1  Sep. 2, 2021

Related U.S. Application Data

(63) Continuation of application No. PCT/JP2019/043873, filed on Nov. 8, 2019.

(30) Foreign Application Priority Data

Nov. 21, 2018  (JP) .................................. 2018-218075

(51) Int. Cl.
H04N 21/4788 (2011.01)
H04N 21/2187 (2011.01)
(Continued)

(52) U.S. Cl.
CPC ..... *H04N 21/4788* (2013.01); *H04N 21/2187* (2013.01); *H04N 21/4725* (2013.01); *H04N 21/4756* (2013.01); *H04N 21/4758* (2013.01)

(58) Field of Classification Search
CPC ........... H04N 21/4788; H04N 21/2187; H04N 21/4756; H04N 21/4758; H04N 21/2543;
(Continued)

(56) References Cited

U.S. PATENT DOCUMENTS 10,616,666 B1\*  4/2020  Pontiff ................... G06T 11/203
2010/0010921 A1\*  1/2010  Liu ......................... G06Q 40/12
705/30
(Continued)

FOREIGN PATENT DOCUMENTS

CN      108235102 A1 \*  6/2018 ......... G06Q 30/0226
JP      2005-185727 A      7/2005
(Continued)

OTHER PUBLICATIONS

"What is Showroom?", [online], Jun. 11, 2016, pp. 1-4, [retrieval date Feb. 8, 2019], internet URL:https://web.archive.org/web/20160611205019/http://matome.naver.jp/odai/2145821919906676901> (9 pages).
(Continued)

*Primary Examiner* — Adil Ocak
(74) *Attorney, Agent, or Firm* — Osha Bergman Watanabe & Burton LLP

(57) ABSTRACT

A video distribution server according to one embodiment of the present invention encourages communication among viewers of a live video, while strengthening the relationship between a distributor of the live video and each of the viewers. The server provides a live video distribution service for distributing and viewing live videos to users via user terminals. The server generates a combo when an input of an item by each of a plurality of viewers of the live video satisfies a predetermined combo condition, thus encouraging communication among the viewers of the live video. In addition, the benefit is given to the distributor upon the generation of the combo, which may strengthen the relationship between the distributor and each of the viewers.

10 Claims, 18 Drawing Sheets

(51) Int. Cl.
*H04N 21/4725* (2011.01)
*H04N 21/475* (2011.01)

(58) Field of Classification Search
CPC ............. H04N 21/258; H04N 21/4725; H04N 21/252; G06F 13/00; G06Q 50/10; G07F 17/3281
See application file for complete search history.

(56) References Cited

U.S. PATENT DOCUMENTS

| | | | | |
|---|---|---|---|---|
| 2011/0105215 | A1* | 5/2011 | Mizue | G07F 17/3244 463/20 |
| 2011/0159940 | A1* | 6/2011 | Acres | G07F 17/34 463/20 |
| 2013/0253993 | A1* | 9/2013 | Brower | G06Q 20/123 705/12 |
| 2014/0335928 | A1* | 11/2014 | Fujisawa | G07F 17/34 463/20 |
| 2014/0358754 | A1* | 12/2014 | Breeden | G06Q 50/10 705/35 |
| 2020/0322685 | A1* | 10/2020 | Kiyooka | G06Q 30/0201 |

FOREIGN PATENT DOCUMENTS

| | | |
|---|---|---|
| JP | 2014-174912 A | 9/2014 |
| JP | 2015-114961 A | 6/2015 |
| JP | 2016-36610 A | 3/2016 |
| JP | 2017-121036 A | 7/2017 |
| WO | 2018/003174 A1 | 1/2018 |

OTHER PUBLICATIONS

Notification of Reasons for Refusal issued in Japanese Patent Application No. 2018-218075, dated Feb. 19, 2019 (8 pages).
International Search Report issued in International Application No. PCT/JP2019/043873, dated Jan. 28, 2020 (5 pages).
Office Action issued in corresponding Japanese Patent Application No. 2022-033021, dated Jun. 28, 2022, with translation (10 pages).
Notice of Reasons for Refusal issued in Japanese Application No. 2022-159762 dated Sep. 26, 2023 (9 pages).

* cited by examiner

USER INFORMATION TABLE 411

| USER ACCOUNT |
| --- |
| BASIC INFORMATION |
| DISTRIBUTION HISTORY INFORMATION |
| VIEWING HISTORY INFORMATION |
| FOLLOWING USER INFORMATION |
| FOLLOWER INFORMATION |
| RANKING |
| RANKING METER VALUE |
| NUMBER OF HELD COINS |
| NUMBER OF HELD DIAMONDS |
| FEVER GAUGE VALUE |
| ... |

FIG. 3

| RANKING BAND | S | | | A | | | B | | | C | | | D | | | E |
| --- | --- | --- | --- | --- | --- | --- | --- | --- | --- | --- | --- | --- | --- | --- | --- | --- |
| RANKING | S+ | S | S- | A+ | A | A- | B+ | B | B- | C+ | C | C- | D+ | D | D- | E |

FIG. 4

DISTRIBUTION INFORMATION TABLE 412

| DISTRIBUTION ID |
| --- |
| DISTRIBUTOR USER ACCOUNT |
| DISTRIBUTION DATE AND TIME |
| DISTRIBUTION DURATION |
| NUMBER OF VIEWERS (CURRENT VALUE AND MAXIMUM VALUE) |
| NUMBER OF COMMENTS |
| NUMBER OF LIKES |
| ITEM POINTS |
| COMBO INFORMATION |
| FEVER TIME FLAG |
| FEVER SCORE |
| BASIC POINTS |
| DISTRIBUTION POINTS |
| ... |

FIG. 5

| ITEM INPUT | | COMBO CONDITION IS SATISFIED? | NUMBER OF COMBOS |
|---|---|---|---|
| VIEWER | ITEM (NUMBER OF COINS IN PARENTHESES) | | |
| 01 | A(1) | — | 0 |
| 02 | B(1) | YES | 1 |
| 03 | B(1) | NO | 1 |
| 04 | C(3) | YES | 2 |
| 05 | D(1) | NO | 2 |
| 06 | E(3) | YES | 3 |
| 02 | F(5) | NO | 3 |
| 05 | F(5) | YES | 4 |
| ... | ... | ... | ... |

FIG. 11

| RATING OF DISTRIBUTION POINTS WITHIN RANKING BAND ON PREVIOUS DAY | FLUCTUATION IN RANKING METER VALUE |
|---|---|
| TOP 10% | +2 |
| TOP 11 TO 30% (REMAINING 20% AFTER SUBTRACTING TOP 10% FROM TOP 30%) | +1 |
| MIDDLE 30% | ±0 |
| BOTTOM 40% | −1 |
| *NO DISTRIBUTION THAT DAY | −1 |

FIG. 16

| RANKING UPDATE DETAILS | NECESSARY RANKING METER VALUE |
|---|---|
| INCREASE IN RANKING TO ANOTHER RANKING BAND | +4 |
| INCREASE IN RANKING WITHIN SAME RANKING BAND | +2 |
| DECREASE IN RANKING WITHIN SAME RANKING BAND | -2 |
| DECREASE IN RANKING TO ANOTHER RANKING BAND | -6 |

FIG. 17

SYSTEM, METHOD, AND COMPUTER-READABLE MEDIUM INCLUDING PROGRAM FOR DISTRIBUTING LIVE VIDEO

CROSS-REFERENCE TO RELATED APPLICATIONS

The present application is a continuation of the international application No. PCT/JP2019/043873, filed on Nov. 8, 2019, the content of which is incorporated herein in its entirety by reference.

TECHNICAL FIELD

The present invention relates to a system, method, and computer-readable medium including a program for distributing live videos.

BACKGROUND ART

Conventional live video distribution services sometimes allow viewers to input virtual items. For example, the system disclosed in Japanese Patent Application Publication No. 2015-114961 is configured to display a special item when a combination of items, each of which is specified by an item display request from each of a plurality of users, satisfies a predetermined condition. Such an item input may encourage communication among viewers and thus make live videos more exciting.

SUMMARY

The conventional system described above may encourage communication among viewers but cannot promote strengthening the relationship between a distributor of a live video and each of viewers. It is desired to achieve a system that, through allowing viewers to input items during the distribution of the live video, can promote strengthening the relationship between the distributor and each of the viewers (i.e., increasing the viewer's engagement with the distributor), while encouraging the communication among the viewers.

One of the objects of embodiments of the present invention is to strengthen the relationship between a distributor and each of viewers of a live video, while encouraging the communication among the viewers. Other objects of embodiments of the present invention will be made apparent with reference to the entire description.

A system according to one embodiment of the present invention is a system that includes one or more computer processors. The one or more computer processors execute machine-readable instructions to perform: distributing a live video provided by a distributor to a plurality of viewers; receiving an input of an item by each of the plurality of viewers during a distribution of the live video; determining, in response to receiving a first input of a first item by a first viewer included in the plurality of viewers, whether the first input satisfies a predetermined combo condition; generating a combo in response to determining the predetermined combo condition being satisfied; and giving, in response to generating the combo, a first benefit to the distributor.

A method according to one embodiment of the present invention is a method executed by one or more computers. The method includes: distributing a live video provided by a distributor to a plurality of viewers; receiving an input of an item by each of the plurality of viewers during a distribution of the live video; determining, in response to receiving a first input of a first item by a first viewer included in the plurality of viewers, whether the first input satisfies a predetermined combo condition; generating a combo in response to determining the predetermined combo condition being satisfied; and giving, in response to generating the combo, a first benefit to the distributor.

A non-transitory computer-readable medium according to one embodiment of the present invention is a non-transitory computer-readable medium including a program. The program causes one or more computers to execute: distributing a live video provided by a distributor to a plurality of viewers; receiving an input of an item by each of the plurality of viewers during a distribution of the live video; determining, in response to receiving a first input of a first item by a first viewer included in the plurality of viewers, whether the first input satisfies a predetermined combo condition; generating a combo in response to determining the predetermined combo condition being satisfied; and giving, in response to generating the combo, a first benefit to the distributor.

Various embodiments of the present invention may strengthen the relationship between a distributor and each of viewers of a live video, while encouraging communication among the viewers.

BRIEF DESCRIPTION OF DRAWINGS

FIG. 3 illustrates information managed in a user information table 411.

FIG. 4 is a diagram illustrating rankings of distributors.

FIG. 5 illustrates information managed in a distribution information table 412.

FIG. 11 is a diagram for explaining a combo condition.

FIG. 16 is a diagram illustrating a rule for updating a ranking meter value.

FIG. 17 is a diagram illustrating a correspondence relationship between ranking update details and necessary ranking meter values.

DETAILED DESCRIPTION

Embodiments of the present invention will be described below with reference to the drawings.

Figure 1:
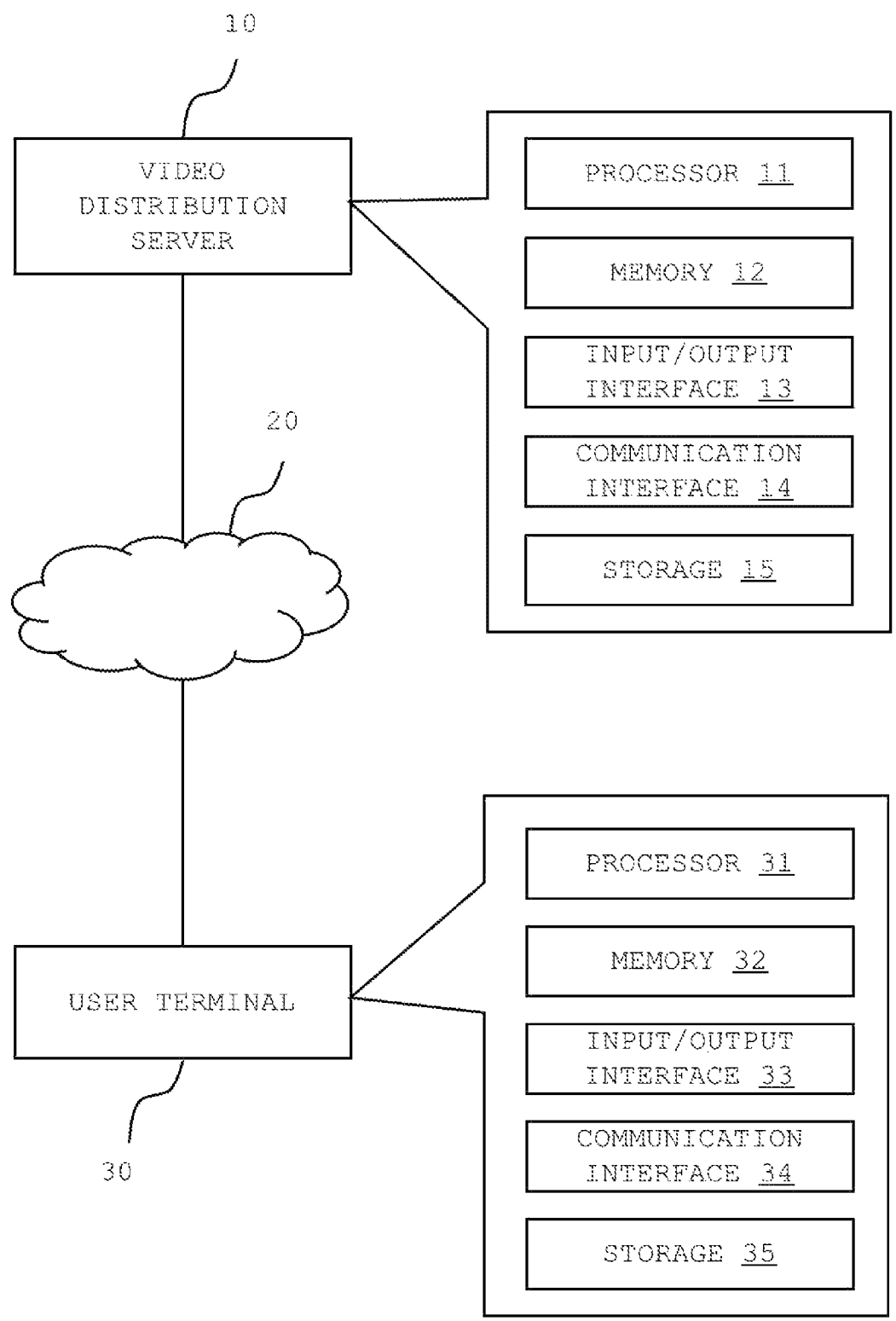
FIG. 1 is a configuration diagram schematically illustrating a configuration of a network including a video distribution server 10 according to an embodiment of the present invention.

FIG. 1 is a configuration diagram schematically illustrating a configuration of a network including a video distribution server 10 according to an embodiment of the present invention. As illustrated, the video distribution server 10 is communicably connected to a user terminal 30 via a communication network 20 such as the Internet. Only one user terminal 30 is illustrated in FIG. 1, but the server 10 is communicably connected to a plurality of user terminals 30. The video distribution server 10 provides a live video distribution (live streaming) service for distributing and viewing live videos to a user via the user terminal 30. In the present embodiment, the user who operates the user terminal 30 can distribute a live video as a distributor (streamer) and can also view live videos provided by other users as a viewer. The video distribution server 10 is an example of a device in which all or a part of a system of the present invention is achieved.

The video distribution server 10 is configured as a typical computer. As illustrated in FIG. 1, the video distribution server 10 includes a computer processor 11, a main memory 12, an input/output interface 13, a communication interface 14, and a storage 15. These components are electrically connected via a bus (not illustrated) or the like.

The computer processor 11 is configured as a CPU, a GPU, or the like, reads various kinds of programs that are stored in the storage 15 or the like into the main memory 12, and executes various kinds of commands (instructions) included in the programs. The main memory 12 is constituted with a DRAM, for example.

The input/output interface 13 includes various kinds of input/output devices for transmitting and receiving information with a user or the like. The input/output interface 13 includes, for example, an information input device such as a keyboard and a pointing device (for example, a mouse, a touch panel, and the like), a sound input device such as a microphone, and an image input device such as a camera. The input/output interface 13 includes an image output device such as a display, and a sound output device such as a speaker.

The communication interface 14 is implemented as hardware such as a network adapter, various kinds of communication software, or combinations thereof, and is configured to achieve wired or wireless communication via the communication network 20 or the like.

The storage 15 is constituted with a magnetic disk, a flash memory, or the like. The storage 15 stores various kinds of programs including an operating system, various kinds of data, and the like.

In the present embodiment, the video distribution server 10 may be configured with a plurality of computers each having the hardware configuration described above. For example, the video distribution server 10 may be constituted with one or more server devices.

The video distribution server 10 configured in such a manner may function as a web server and an application server. In this case, the video distribution server 10 executes various kinds of processing in response to a request from a web browser and other applications installed on the user terminal 30, and transmits, to the user terminal 30, screen data (such as HTML data), control data, and the like according to a result of the processing. The user terminal 30 may display a web page or another screen based on the received data.

The user terminal 30 is configured as a typical computer. As illustrated in FIG. 1, the user terminal 30 includes a computer processor 31, a main memory 32, an input/output interface 33, a communication interface 34, and a storage 35. These components are electrically connected via a bus (not illustrated) or the like.

The computer processor 31 is configured as a CPU, a GPU, or the like, reads various kinds of programs that are stored in the storage 35 or the like into the main memory 32, and executes various kinds of commands (instructions) included in the programs. The main memory 32 is constituted with a DRAM or the like, for example.

The input/output interface 33 includes various kinds of input/output devices for transmitting and receiving information with a user or the like. The input/output interface 33 includes, for example, an information input device such as a keyboard and a pointing device (for example, a mouse, a touch panel, and the like), a sound input device such as a microphone, and an image input device such as a camera. The input/output interface 33 includes an image output device such as a display, and a sound output device such as a speaker.

The communication interface 34 is implemented as hardware such as a network adapter, various kinds of communication software, or combinations thereof, and is configured to achieve wired or wireless communication via the communication network 20 or the like.

The storage 35 is constituted with a magnetic disk, a flash memory, or the like. The storage 35 stores various kinds of programs including an operating system, various kinds of data, and the like. The programs stored in the storage 35 may be downloaded from an application market or the like and then installed.

In the present embodiment, the user terminal 30 may be configured as a smartphone, a tablet terminal, a wearable device, a personal computer, a game console, and the like.

The user who operates the user terminal 30 having the above configuration can use a live video distribution service provided by the video distribution server 10 by executing communication with the video distribution server 10 via a web browser or another application installed in the storage 35 or the like.

Figure 2:
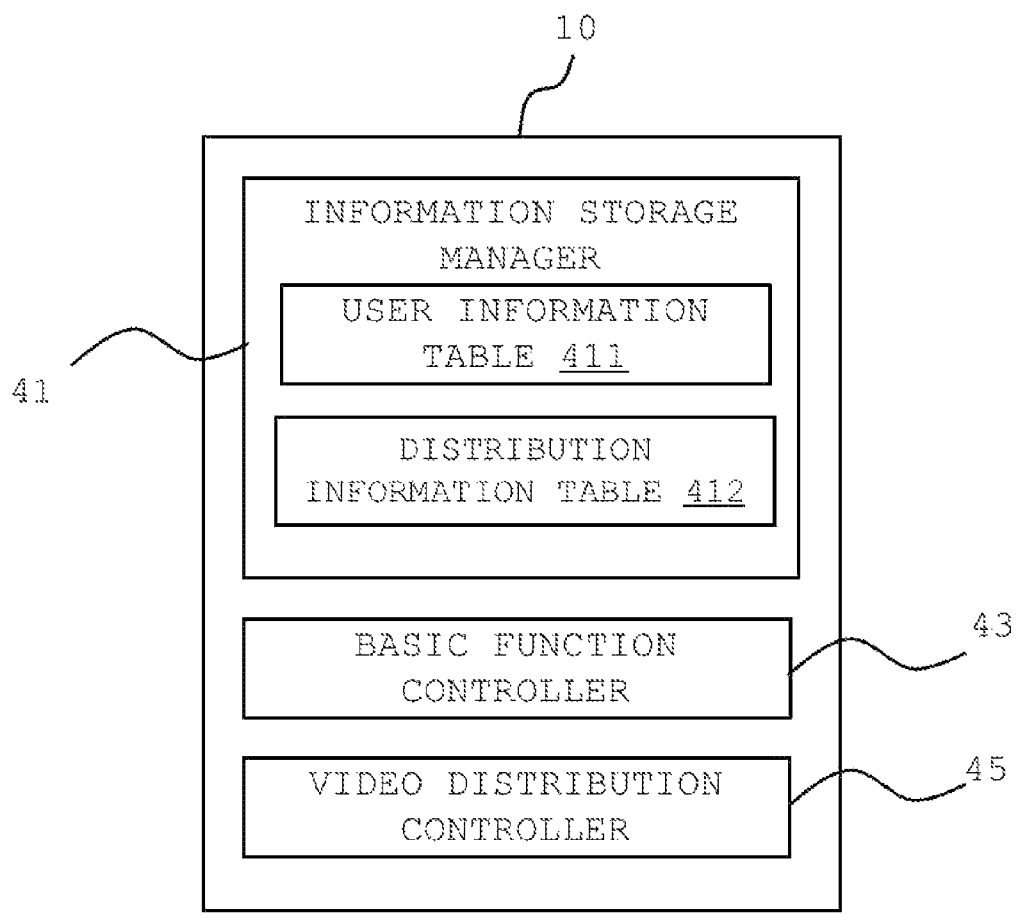
FIG. 2 is a block diagram schematically illustrating functions of the video distribution server 10.

Next, the functions of the video distribution server 10 according to the present embodiment will be described. FIG. 2 is a block diagram schematically illustrating the functions of the video distribution server 10. As illustrated, the server 10 includes an information storage manager 41 that stores and manages various information, a basic function controller 43 that controls basic functions of the live video distribution service, and a video distribution controller 45 that controls the distribution of live videos. These functions are achieved by the cooperative operation of hardware, such as the computer processor 11 and the main memory 12, and various programs and data stored in the storage 15 and the like, such as a program for providing the live video distribution service. For example, the functions are achieved by the computer processor 11 executing commands included in a program loaded into the main memory 12. In addition, some or all the functions illustrated in FIG. 2 may be achieved by the cooperative operation of the server 10 and the user terminal 30 or can be achieved by the user terminal 30.

The information storage manager 41 of the video distribution server 10 stores and manages various kinds of information in the storage 15 and the like. For example, as illustrated in FIG. 2, the information storage manager 41 is configured to manage a user information table 411 for managing information related to a user of the live video distribution service, and a distribution information table 412 for managing information related to the distribution of individual live videos.

The basic function controller 43 of the video distribution server 10 executes various processing related to the control of basic functions of the live video distribution service. For example, the basic function controller 43 transmits data, such as screen data and control data, for various screens related to the basic functions to the user terminal 30, executes various processing in response to an operation inputted by the user via the screen displayed on the user terminal 30, and transmits data, such as the screen data and the control data, according to a result of the processing to the user terminal 30. The basic functions controlled by the basic function controller 43 include, for example, login processing (user authentication), fee charging control, and user management (for example, updating of the user information table 411).

The video distribution controller 45 of the video distribution server 10 executes various processing related to control of the distribution of live videos. For example, the video distribution controller 45 is configured to distribute a live video provided by each of a plurality of distributors to a plurality of viewers. For example, the video distribution controller 45 is configured to receive a live video (stream) transmitted from the user terminal 30 of a distributor (hereinafter sometimes referred to as a "distributor terminal 30") and then transmit the live video to the user terminal 30 of each of the plurality of viewers (hereinafter sometimes referred to as a "viewer terminal 30"). The live video is formed of, for example, images inputted through a camera of the distributor terminal 30 and the sound inputted through a microphone of the distributor terminal 30. Such a live video may be distributed by, for example, a streaming method using a protocol such as HTTP Live Streaming (HLS).

In the present embodiment, the video distribution controller 45 is configured to receive inputs of items for a distributor of a live video during the distribution of the live video. The item can be inputted by each of the plurality of viewers. For example, the video distribution controller 45 is configured to present the live video to each of a plurality of viewers via a predetermined screen displayed on each of the viewer terminals 30, and to display the item, which has been inputted via the predetermined screen by a certain viewer, in the predetermined screen on each of the viewer terminals 30. For example, the item may be superimposed on the live video. The item that can be inputted by the viewer may include various kinds of virtual and electronic items. Such an item may be given to viewers for a fee or for a free at various times.

In the present embodiment, the video distribution controller 45 is configured to determine, in response to the input of the item by the viewer, whether the input of the item satisfies a predetermined combo condition and then generate a combo if this condition is satisfied.

In addition, the video distribution controller 45 is configured to give a first benefit to the distributor in response to generating a combo. The first benefit can bring advantages to the distributor and may be configured as various kinds of virtual and electronic items or points, or various parameter values. The number (total) of the first benefits held by the distributor may be stored and managed, for example, in the user information table 411 or the distribution information table 412.

As described above, the video distribution server 10 according to the present embodiment generates a combo when an input of an item by a viewer of the live video satisfies the predetermined combo condition, thus encouraging communication among viewers. In addition, the first benefit is given to a distributor of the live video in response to the generation of the combo, which may strengthen the relationship between the distributor and each of the viewers.

In the present embodiment, the video distribution controller 45 may be configured to generate a combo with chaining the combo to the last combo generated just before the combo if the input of the item is performed within a chainable period that starts upon generating the last combo (i.e., before the chainable period is expired) and the input of the item satisfies the predetermined combo condition. The chainable period may typically expire when a predetermined time elapses from the generation of the corresponding combo without the occurrence of the chaining. In this case, the video distribution controller 45 may be configured to give a larger number of the first benefits to the distributor as the number of chained combos increases. The number of chained combos may be referred to simply as the "number of combos". In addition, the video distribution controller 45 may be configured to clear one or more existing combos (e.g., clear the number of combos) upon the expiration of the chainable period. For example, one unchained combo is cleared, or a plurality of chained combos are cleared. Once the one or more existing combos are cleared, a new chain of combos can start upon the generation of the next combo. This configuration may promote the chained combos, thus further encouraging communication among the viewers.

In the present embodiment, the predetermined combo condition for generating a combo may include various conditions related to an input of an item. The predetermined combo condition includes a condition related to a combination the first input of the first item and the second input of the second item that is performed before the first input. For example, the predetermined combo condition may include a condition that the relationship between the value of the first item and the value of the second item is a predetermined relationship. The second item may include an item inputted just before the first item or an item inputted when the last combo is generated. For example, the predetermined combo condition may include a condition that the value (e.g., price in real or in virtual currency) of the first item is higher than the value of the second item. This configuration may encourage cooperation between a viewer who hold items of high value (e.g., advanced users) and a viewer who do not hold items of high value but only items of low value (e.g., beginners), thus further encouraging communication among various viewers.

The predetermined combo condition may also include a condition that the number of times the same item is inputted in a plurality of chained combos is less than or equal to a threshold value. The "same item" may mean any items of the same type. For example, the number of input times of the same item in a chain of combos may be limited to one or less. In this case, the present input of "item A" does not satisfy the predetermined combo condition if "item A" has already been inputted at a generation of any one of the plurality of chained combos. This configuration may encourage the inputs of various kinds of items in a chain of combos.

The predetermined combo condition may also include a condition that the number of times any item is inputted by the same viewer in a plurality of chained combos is less than or equal to a threshold value. For example, the number of input times of any item by the same viewer in a chain of combos may be limited to one or less. In this case, the present input of any item by "viewer A" does not satisfy the predetermined combo condition if "viewer A" has already inputted any item in a chain of combos. This configuration may encourage many viewers to participate in chaining combos (i.e., to input items).

The video distribution controller 45 may be configured to give a distributor a second benefit during the distribution of a live video. In this case, the number of the second benefits to be given to the distributor may be set based at least on the viewing status (performance) of a plurality of viewers. For example, the video distribution controller 45 may be configured to set the number of the second benefits to be given to the distributor based on the number of viewers or the input status (performance) of items, comments, likes, and the like by each of the plurality of viewers. The second benefit can bring advantages to the distributor and may be configured as various kinds of virtual and electronic items or points, or various parameter values. The number (total) of the second benefits held by the distributor may be stored and managed, for example, in the user information table 411 or the distribution information table 412.

The video distribution controller 45 may be configured to start a predetermined mode on a condition that the number of the first benefits held by a distributor is equal to or greater than a threshold value. In the predetermined mode, the number of the second benefits to be given to the distributor is enhanced (increases). For example, the number of the second benefits to be given to the distributor during the predetermined mode is greater than that not during the predetermined mode, under the same viewing status. In this case, the first benefit can be said to be a parameter value that is accumulated to start the predetermined mode. This configuration may bring advantages to the distributor via the predetermined mode.

The video distribution controller 45 may be configured to start the predetermined mode in response to an instruction by a distributor after the number of the first benefits held by the distributer reaches a threshold value. This configuration may allow the distributor to determine when starting the predetermined mode. As a result, the strategic thinking regarding the start of the predetermined mode is required, which may give enjoyment to the distributor and encourage communication between the distributor and viewers.

The video distribution controller 45 may be configured to enable an input of a dedicated item for the predetermined mode in response to starting the predetermined mode. This configuration may increase the scarcity value of the dedicated item for the predetermined mode and thus promote inputs of items during the predetermined mode.

Next, a specific example of the video distribution server 10 according to the present embodiment having such functions will be described. FIG. 3 illustrates information managed in the user information table 411 in this example. The user information table 411 manages information related to users of the live video distribution service. As illustrated, the table 411 manages, in association with "user account" that identifies an individual user, information such as "basic information", which includes an account name, age, gender, and the like; "distribution history information", which is information related to the distribution history of live videos; "viewing history information", which is information related to the viewing history of live videos distributed by other users; "following user information", which is information related to other users followed by the user; "follower information", which is information related to other users (followers) who are following the user; "ranking", which indicates a ranking of the user as a distributor; "ranking meter value", which is a parameter value for determining whether to increase or decrease the ranking; "number of held coins", which indicates how many virtual coins are held in the live video distribution service; "number of held diamonds", which indicates how many virtual diamonds are held in the live video distribution service; and "fever gauge value" (first benefit), which indicates the value of the fever gauge used for starting "fever time mode" (a predetermined mode) during the distribution of the live video.

FIG. 4 is a diagram illustrating a "ranking" of a distributor in this example. As illustrated, there are six ranking bands of "S", "A", "B", "C", "D", and "E", and each of the five ranking bands of "S", "A", "B", "C", and "D" has three rankings (for example, a ranking in which "+" is added to a letter indicating a ranking band, a ranking with just the letter, and a ranking in which "−" is added to the letter, such as "S+", "S", and "S−"). The ranking band of "E" has one ranking, "E". That is, there are 16 levels (3×5+1=16) of rankings in this example.

Further, among the ranking bands, the "S" side is the highest and the "E" side is the lowest. Among the rankings in the same ranking band, the "+" side is the highest and the "−" side is the lowest. In this example, the ranking of a user is set to "D−" as the initial value.

FIG. 5 illustrates information managed in the distribution information table 412 in this example. The distribution information table 412 manages information related to the distribution of individual live videos. As illustrated, the distribution information table 412 manages, in association with "distribution ID" that identifies an individual distribution (live video), information such as "distributor user account", which identifies a distributor of the distribution; "distribution date and time"; "distribution duration", which indicates a continuous duration of the distribution; "number of viewers (current value and maximum value)"; "number of comments", which is the number of comments inputted by viewers; "number of likes", which is the number of "likes" inputted by viewers; "item points", which increase according to inputs of items by viewers; "combo information", which is information related to a combo generated upon an input of an item; "fever time flag", which indicates whether it is currently the fever time mode; "fever score", which increases according to inputs of comments, likes, and items during the fever time mode; "basic points", which are the fundamental points given for the distribution; "distribution points" (second benefits), which are points obtained by adding "fever score" to "basic points". The combo information includes, for example, the number of combos and the combo history. The combo history includes, for example, the history of inputs of items performed in a chain of combos and the history of the combination of the viewer and the item inputted by the viewer in the chain of combos.

Figure 6:
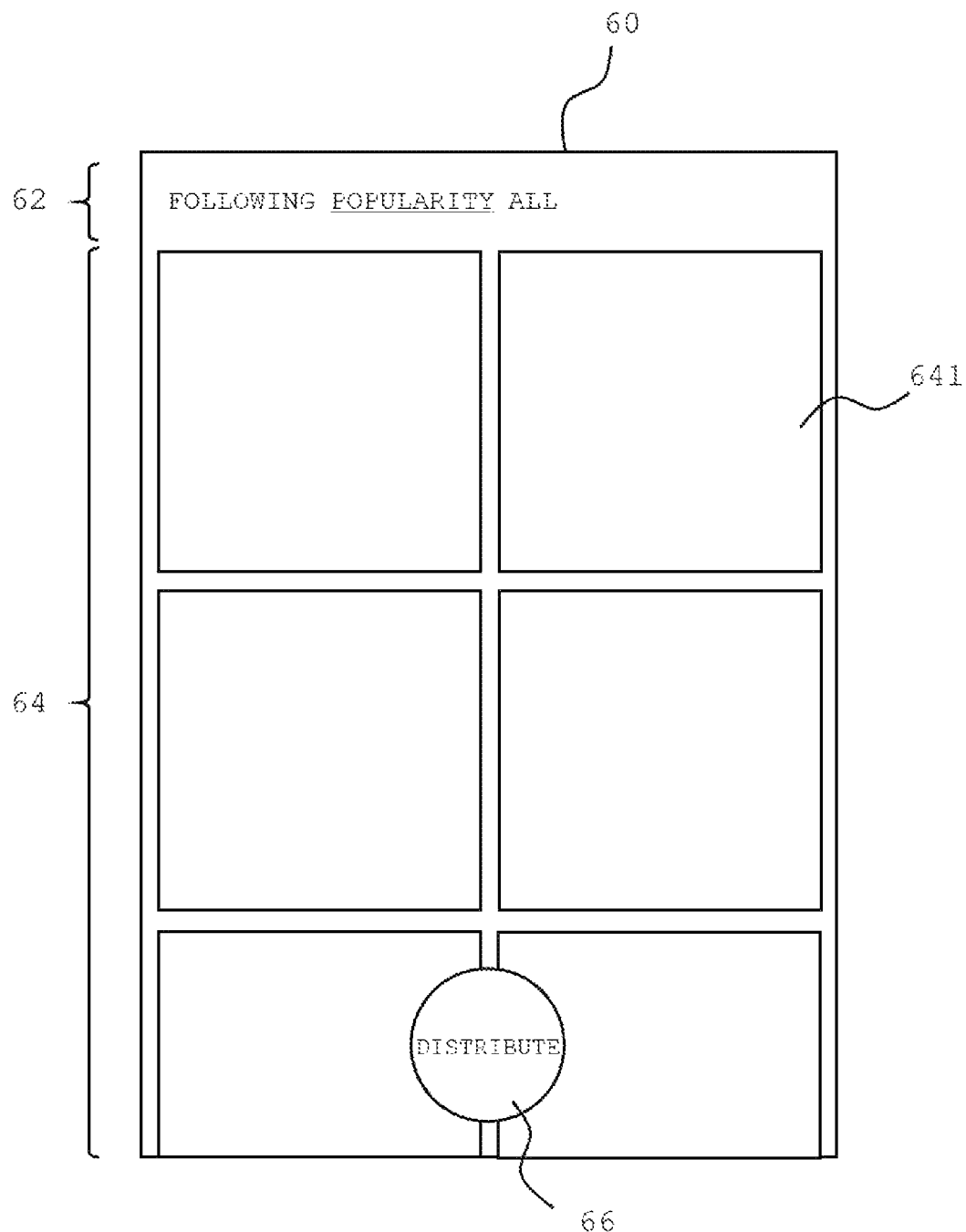
FIG. 6 illustrates a top screen 60.

FIG. 6 illustrates a top screen 60 of the live video distribution service. As illustrated, the screen 60 includes a filter area 62 in which "FOLLOWING", "POPULALITY", and "ALL" are displayed, a list display area 64 displaying a list of live videos being distributed, and a distribution start button 66 labeled "DISTRIBUTE".

The filter area 62 is an area for setting filtering for the live videos displayed in the list display area 64. Specifically, when "FOLLOWING" is selected in the filter area 62, the live videos to be listed in the list display area 64 are narrowed down to live videos of other users followed by the user. Similarly, when "POPULARITY" is selected in the filter area 62, the live videos to be listed in the list display area 64 are narrowed down to live videos extracted in accordance with a predetermined extraction condition for extracting popular videos. The predetermined extraction condition includes, for example, a condition that the number of viewers (current value) is more than or equal to a threshold value. When "ALL" is selected in the filter area 62, no filtering is set, and all live videos being distributed are targets to be listed in the list display area 64.

In the list display area 64, a plurality of individual display areas 641, each of which displays information related to an individual live video, are arranged in two columns. The individual display area 641 displays, for example, a still image preset by a distributor of the live video, the account name of the distributor, and the number of viewers (current value). The list display area 64 is configured such that a plurality of individual display areas 641 to be displayed are switched by a flicking or sliding operation in the up and down direction.

The distribution start button 66 is an object that allows a user to start distributing a live video as a distributor. When a user selects the distribution start button 66, the distribution of the live video starts. Specifically, the video formed of images inputted via the camera of the user terminal 30 and sound inputted via the microphone of the user terminal 30 starts to be transmitted to the server 10. In addition, a new record is created in the distribution information table 412 in response to the start of the live video distribution.

Figure 7:
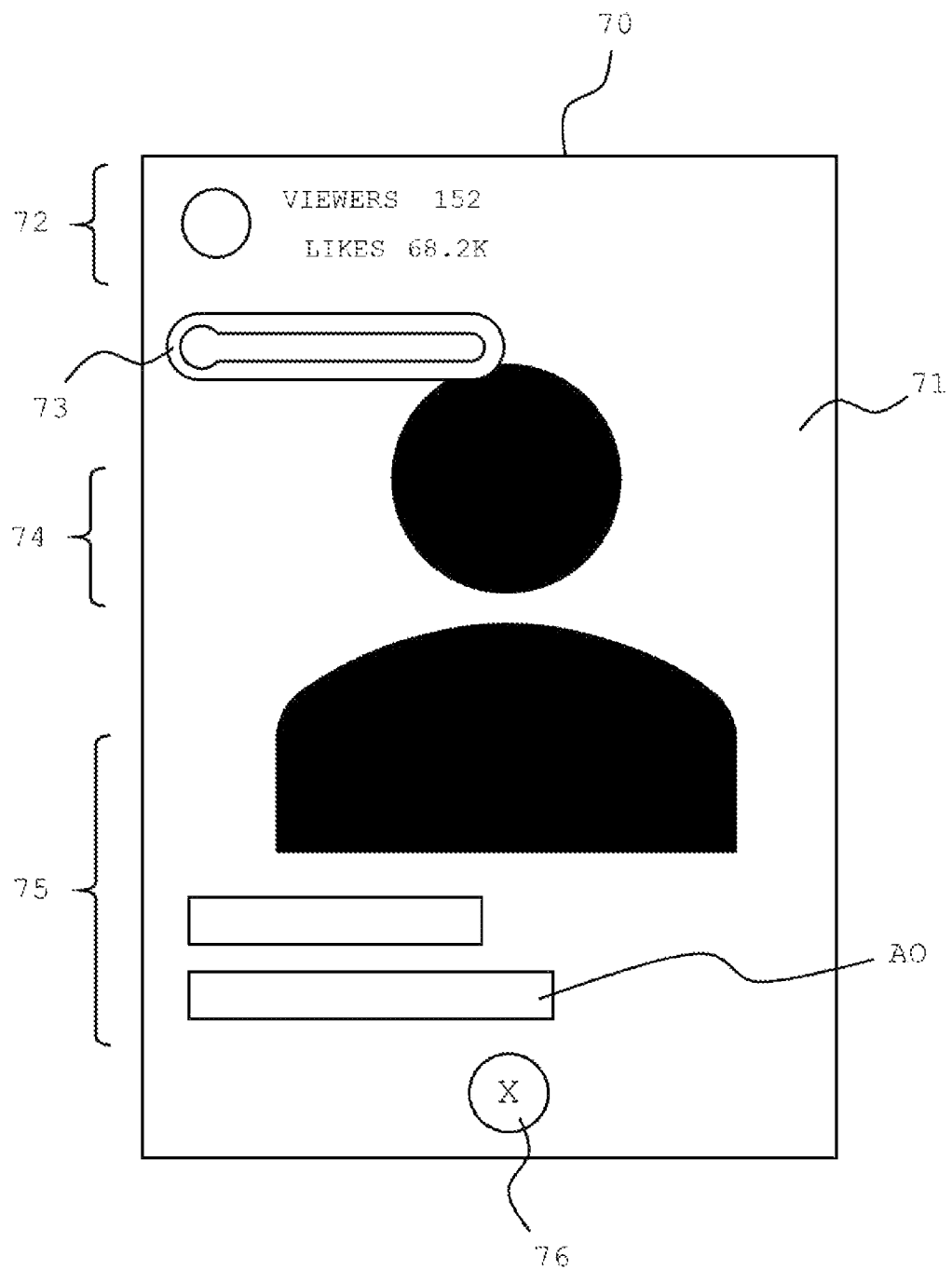
FIG. 7 illustrates a distributor screen 70.

FIG. 7 illustrates a distributor screen 70 displayed on the distributor terminal 30 in response to the selection of the distribution start button 66 (i.e., the start of the live video distribution). As illustrated, the screen 70 includes a video display area 71 corresponding to the entire screen, a basic information display area 72 located at the upper left corner of the screen, a fever gauge 73 located below the area 72, an item information display area 74 located below the fever gauge 73, an action information display area 75 located below the area 74, and a circular distribution stop button 76 located at the center of the bottom edge of the screen.

The video display area 71 displays a live video to be distributed (i.e., images inputted via the camera of the distributor terminal 30). The distributor usually makes himself/herself the subject of the video via the in-camera of the distributor terminal 30 and thus the image of the distributor himself/herself is included in the live video to be distributed.

The basic information display area 72 displays basic information of the distribution. The basic information of the distribution specifically includes distributor information (such as a profile image), the number of viewers (current value), and the number of "likes" inputted by viewers.

The fever gauge 73 displays the value of the distributor's fever gauge in a gauge format. As described above, the fever gauge value is managed in the user information table 411. As described in detail below, the fever gauge value increases upon the generation and chaining of combos based on inputs of items by viewers.

The item information display area 74 displays, in response to an input of an item by a viewer, information related to the input of the item. The details are described later.

The action information display area 75 displays information related to an action performed by each viewer. Specifically, a plurality of action objects AO corresponding to individual actions are arranged in the up and down direction in the area 75. The action information display area 75 is configured such that, when a viewer performs a new action, the corresponding action object AO is added to the bottom of the area 75 and the existing action objects AO sequentially move upward. In addition, the action information display area 75 is configured such that the action objects AO to be displayed are switched by a flicking or sliding operation in the up and down direction. The viewer's actions displayed in the action information display area 75 include entering a distribution room (starting viewing) and inputting a "like", a comment, and an item.

The distribution stop button 76 is an object that allows a distributor to stop the distribution of the live video. When a distributor selects the distribution stop button 76, the distribution of the live video (transmission of the live video from the distributor terminal 30 to the server 10) is stopped.

Figure 8:
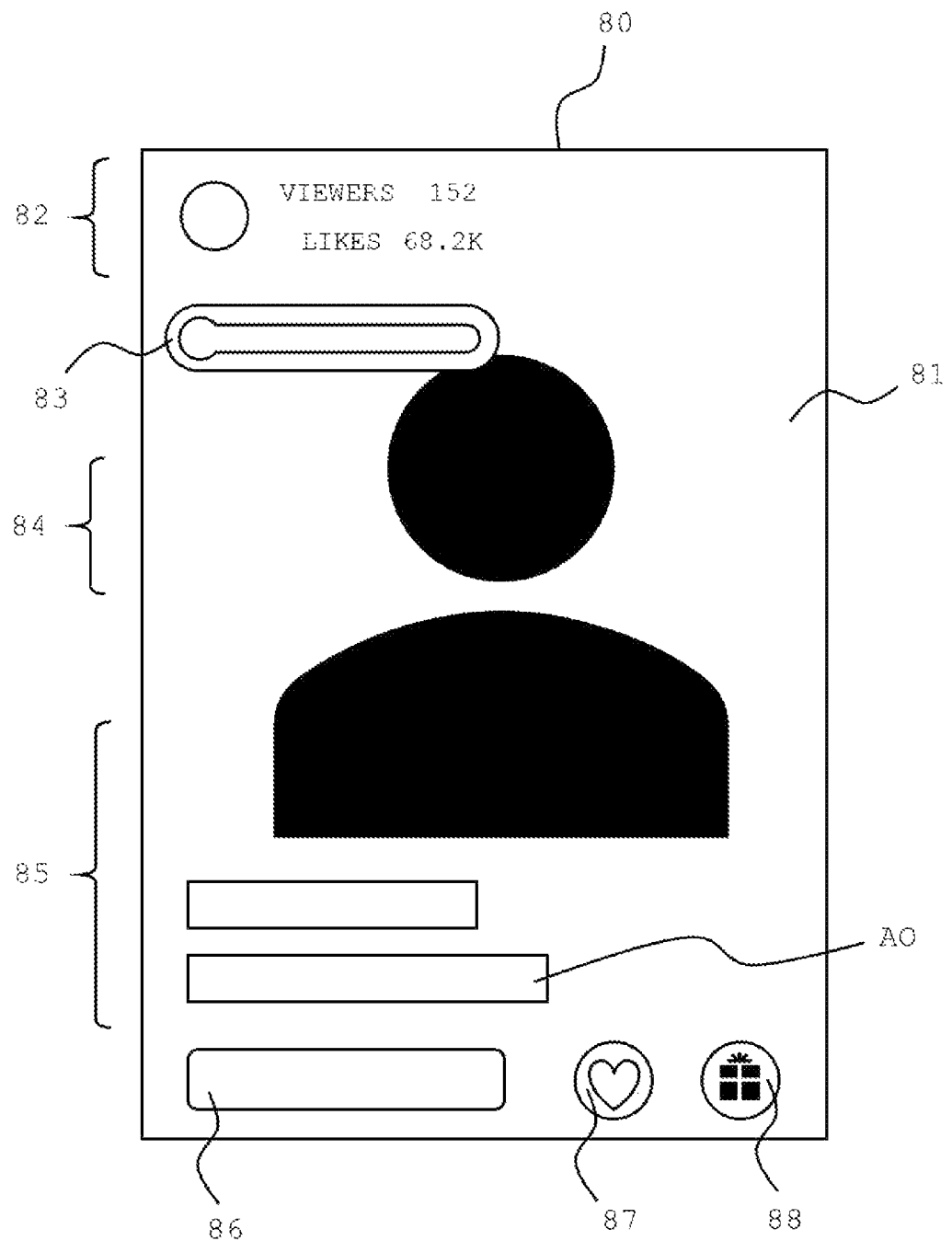
FIG. 8 illustrates a viewer screen 80.

FIG. 8 illustrates a viewer screen 80 displayed on the viewer terminal 30. For example, when a viewer selects any live video in the list display area 64 of the top screen 60, the viewing screen 80 for viewing the selected live video is displayed on the viewer terminal 30. As illustrated, the screen 80 has a video display area 81, a basic information display area 82, a fever gauge 83, an item information display area 84, and an action information display area 85, which are like the distributer screen 70 described above. In addition, the viewer screen 80 has a comment input area 86, a "like" button 87 with a heart mark displayed, and an item input button 88 with a symbol of a gift displayed, at the bottom edge of the screen.

The comment input area 86 is an area that allows a viewer to input a comment. When a viewer inputs a comment via the area 86, the action object AO corresponding to the input of the comment is added to the action information display area 75 of the distributor screen 70 of the distributor terminal 30 and the action information display area 85 of the viewer screen 80 of each viewer terminal 30. The action object AO corresponding to the comment displays the account name of the viewer who has inputted the comment together with the comment body (text). Further, when a comment is inputted, the number of comments in the distribution information table 412 is updated (increased by one).

The "like" button 87 is an object that allows a viewer to input a "like" for a distributor. When a viewer selects the button 87, a "like" is inputted and the action object AO corresponding to the "like" is added to the action information display areas 75 and 85. The action object AO corresponding to the "like" displays the account name of the viewer who has inputted the "like" together with text indicating the input of a "like". In addition, when a "like" is inputted, a predetermined visual effect (such as an animation effect in which heart-shaped objects are displayed as flowing from the bottom to the top of the screen) is added in the video display areas 71 and 81. Further, when a "like" is inputted, the number of "likes" in the distribution information table 412 is updated (increased by one).

Figure 9:
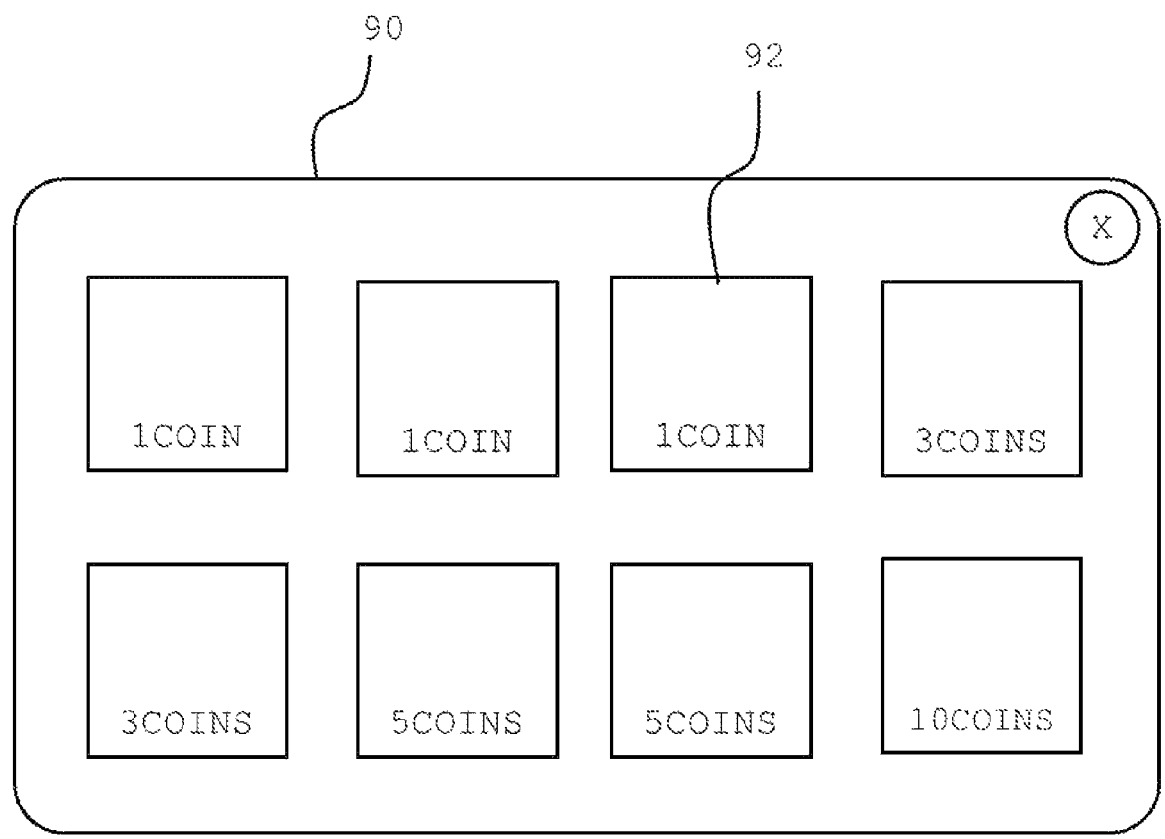
FIG. 9 illustrates an item selection screen 90.

The item input button 88 is an object that allows a viewer to input an item. When a viewer selects the button 88, an item selection screen 90 illustrated in FIG. 9 is displayed over the viewer screen 80. As illustrated, the screen 90 displays a list of individual display areas 92 each displaying information related to an item. The individual display area 92 displays an image of the corresponding item and the number of coins required to input the item.

In this example, a plurality of items that can be inputted by viewers are predetermined, and each of the plurality of items has the number of coins as a price (value). The item selection screen 90 displays a list of a plurality of items that can be inputted. When a viewer selects any of the items via the item selection screen 90, the selected item is inputted.

Figure 10:
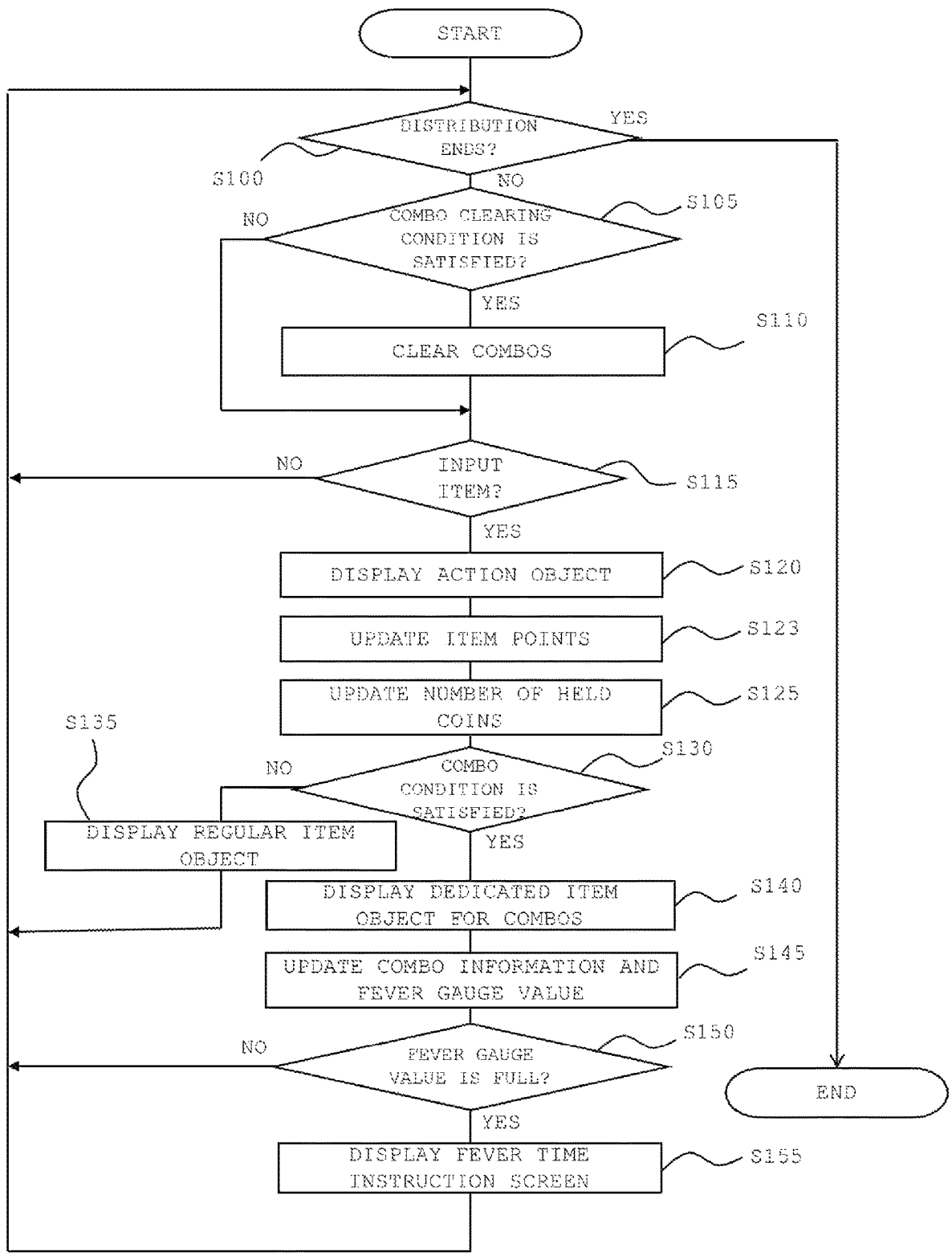
FIG. 10 is a flowchart illustrating a process related to an input of an item by a viewer.

The process related to an input of an item will be described in detail. FIG. 10 is a flowchart illustrating the process related to an input of an item by a viewer in this example. The server 10 executes this process. As illustrated, the server 10 waits for an input of an item (NO in step S115) during the distribution of a live video (NO in step S100). When a combo clearing condition for clearing one or more existing combos is satisfied during the period of waiting for an input of items (YES in step S105), the server 10 clears the one or more existing combos (Step S110). The clearing of combos will be described later.

When any viewer inputs an item during the period of waiting for an input of items (YES in step S115), the server 10 displays the corresponding action object (step S120). Specifically, the action object AO corresponding to an input of an item is added in the action information display area 75 of the distributor screen 70 and the action information display area 85 of the viewer screen 80. In the action object AO corresponding to an input of an item, the name of the inputted item is displayed, together with the account name of the viewer who has inputted the item.

The server 10 then updates the item points for this distribution (step S123). Specifically, the number of points corresponding to the number of coins required to input the item are given to this distribution and are added to the item points for the corresponding distribution in the distribution information table 412. The number of item points to be given increases as the number of coins required to input the item increases, for example.

Subsequently, the server 10 updates the number of held coins of the viewer who has inputted the item (step S125). Specifically, the number of coins corresponding to the inputted item is subtracted from the number of held coins for the corresponding user (viewer who has inputted the item) in the user information table 411.

The server 10 then determines whether the input of the item satisfies the combo condition (step S130). The combo condition in this example has the following five necessary conditions. In other words, when all the five conditions are satisfied, the combo condition is satisfied.

1. The time elapsed since the last combo (or the last input of an item if no combos exist) is within 30 seconds.
2. The number of coins corresponding to the item inputted this time is greater than or equal to the number of coins corresponding to the item inputted at the generation of the last combo (or the item inputted last time if no combos exist).
3. The viewer who inputs the item this time has not yet inputted any item at a generation of each of the one or more existing combos (i.e., the number of times the same viewer inputs any item in a chain of combos is one or less).
4. The item inputted this time has not yet been inputted at a generation of each of the one or more existing combos (i.e., the number of times the same item is inputted in a chain of combos is one or less).
5. The fever gauge is not full.

FIG. 11 is a diagram for explaining the combo condition in this example. Specifically, FIG. 11 illustrates a table indicating, from the top to the bottom of the table, a situation in which the number of combos is updated as items are repeatedly inputted. The following explanation assumes that the interval between successive combos is within 30 seconds (that is, the condition 1 is satisfied) and the fever gauge is not full (that is, the condition 5 is satisfied). As illustrated, first, the viewer "01" inputs the item "A" (1). In this explanation, the number of coins required to input an item is in parentheses following a name of the item, which also applies below. At this point, the number of combos is zero.

Next, the viewer "02" inputs the item "B" (1). The number of coins required to input the item "B" (1) inputted this time is equal to that required to input the item "A" (1) inputted last time and thus the condition 2 is satisfied. In addition, since no combos has been generated, the conditions 3 and 4 are satisfied. As a result, the combo condition is satisfied and thus the number of combos increases from "0" to "1".

Subsequently, the viewer "03" inputs the item "B" (1). The item "B" inputted this time has already been inputted at the generation of the last combo and thus the condition 4 is not satisfied. As a result, the combo condition is not satisfied and thus the number of combos remains at "1".

Next, the viewer "04" inputs the item "C" (3). The number of coins required to input the item "C" (3) inputted this time is greater than that required to input the item "B" (1) inputted at the generation of the last combo and thus the condition 2 is satisfied. In addition, since the viewer "04" who inputs the item this time has not inputted any item in a chain of combos, the condition 3 is satisfied. Further, the item "C" inputted this time has not been inputted in a chain of combos and thus the condition 4 is satisfied. As a result, the combo condition is satisfied and thus the number of combos increases from "1" to "2".

Subsequently, the viewer "05" inputs the item "D" (1). The number of coins required to input the item "D" (1) inputted this time is less than that required to input the item "C" (3) inputted at the generation of the last combo and thus the condition 2 is not satisfied. As a result, the combo condition is not satisfied and thus the number of combos remains at "2".

Next, the viewer "06" inputs the item "E" (3). The number of coins required to input the item "E" (3) inputted this time is equal to that required to input the item "C" (3) inputted at the generation of the last combo and thus the condition 2 is satisfied. In addition, since the viewer "06" who inputs the item this time has not inputted any item in a chain of combos, the condition 3 is satisfied. Further, the item "E" inputted this time has not been inputted in a chain of combos and thus the condition 4 is satisfied. As a result, the combo condition is satisfied and thus the number of combos increases from "2" to "3".

Subsequently, the viewer "02" inputs the item "F" (5). The viewer "02" who inputs the item this time has already inputted the item in a chain of combos (i.e., the viewer "02" has inputted the item "B" at the generation of the first combo) and thus the condition 3 is not satisfied. As a result, the combo condition is not satisfied and thus the number of combos remains at "3".

Next, the viewer "05" inputs the item "F" (5). The number of coins required to input the item "F" (5) inputted this time is greater than that required to input the item "E" (3) inputted at the generation of the last combo and thus the condition 2 is satisfied. In addition, since the viewer "05" who inputs the item this time has not yet inputted any item in a chain of combos, the condition 3 is satisfied. Further, the item "F" inputted this time has not been inputted in a chain of combos and thus the condition 4 is satisfied. As a result, the combo condition is satisfied and thus the number of combos increases from "3" to "4".

Figure 12:
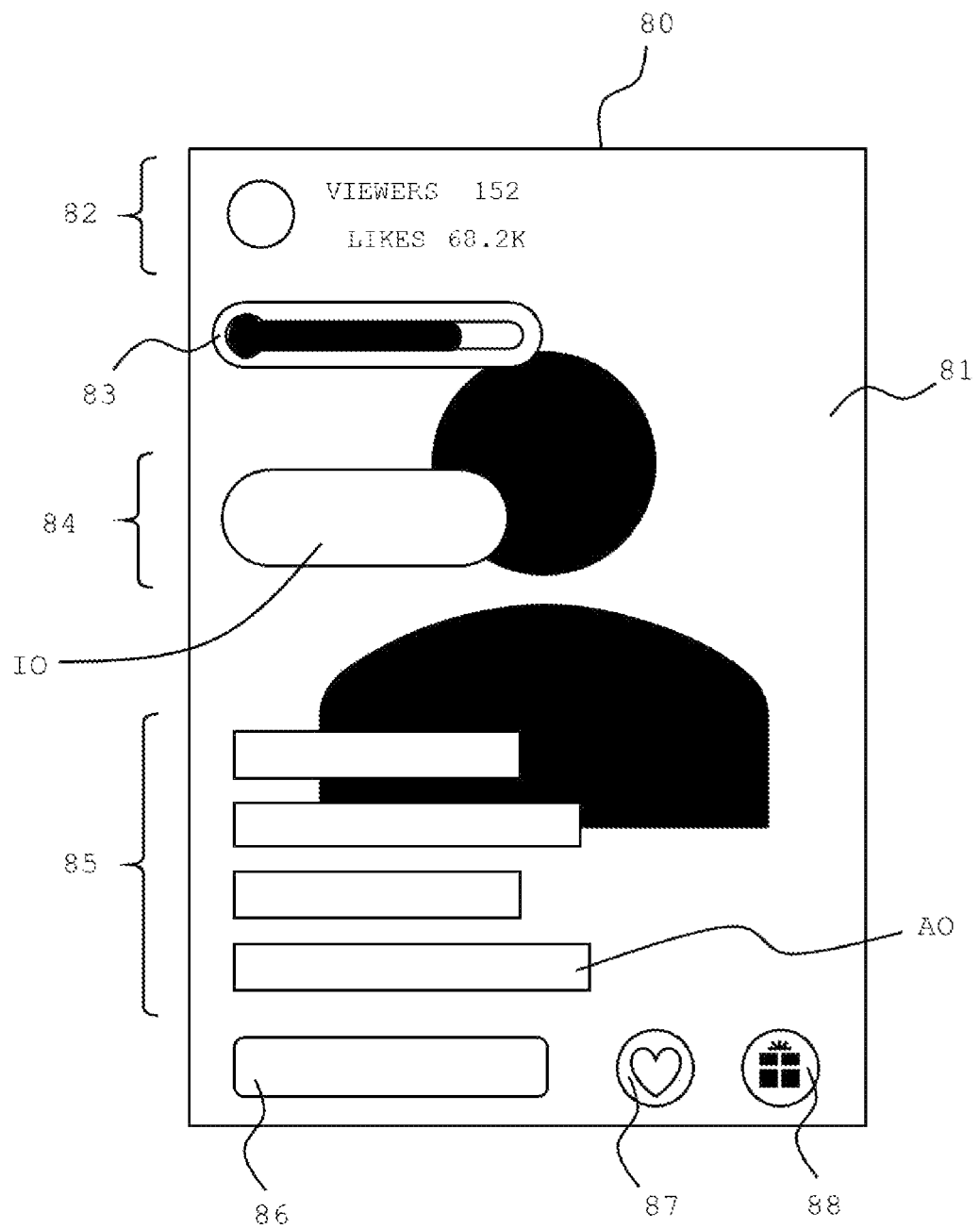
FIG. 12 illustrates the viewer screen 80 in which an item object IO is displayed.
Figure 13A:
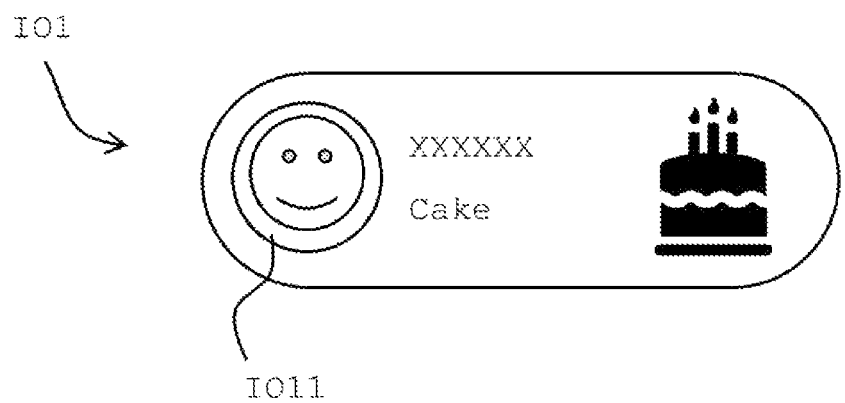
FIG. 13A illustrates a regular item object IO1.
Figure 13B:
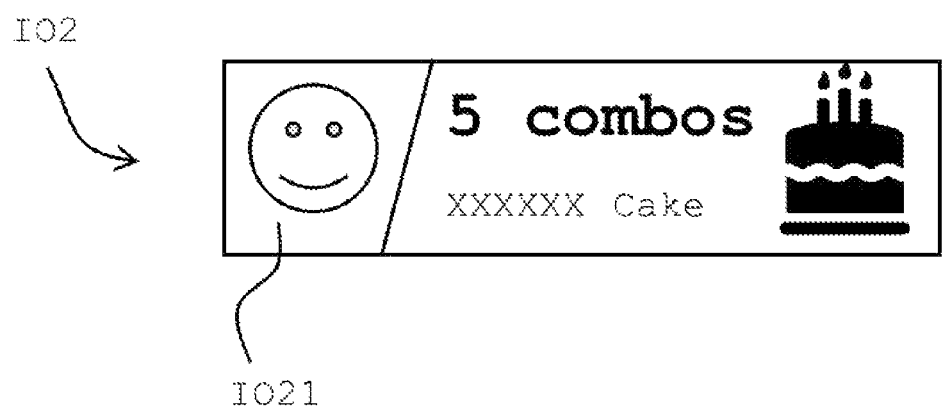
FIG. 13B illustrates a dedicated item object IO2 for combos.

Returning to the flowchart in FIG. 10, when the input of the item does not satisfy the combo condition (NO in step S130), the server 10 displays a regular item object (step S135). On the other hand, when the input of the item satisfies the combo condition (YES in step S130), the server 10 displays a dedicated item object for combos (step S140). FIG. 12 illustrates the viewer screen 80 displaying an item object IO in the item information display area 84. Similarly, the item object IO is also displayed in the item information display area 74 of the distributor screen 70. The item object IO disappears when a predetermined amount of time has elapsed since the item object IO is displayed in the item information display areas 74 and 84. With the appearance or disappearance of the item object IO, a predetermined visual effect corresponding to the inputted item may be added to the video display areas 71 and 81, In this example, the regular item object displayed when the input of the item does not satisfy the combo condition and the dedicated item object for combos displayed when the input of the item satisfies the combo condition, are different in appearance from each other. FIG. 13A illustrates a regular item object IO1 and FIG. 13B illustrates a dedicated item object IO2 for combos. As illustrated, the regular item object IO1 has a rectangular outline with rounded corners. In the left part of the regular item object IO1, a circular viewer image display area IO11 is located. The viewer image display area IO11 displays the profile image of the viewer who inputs the corresponding item. In the regular item object IO1, the account name of the viewer is displayed, as well as the name and image of the inputted item. On the other hand, the dedicated item object IO2 for combos has a general rectangular outline (with non-rounded corners), as illustrated. In the left part of the item object IO2, a trapezoidal viewer image display area IO21 is located. In the viewer image display area IO21, the profile image of the viewer who inputs the item is displayed. In the dedicated item object IO2 for combos, the number of combos is displayed, in addition to the account name of the viewer and the name and image of the inputted item. For example, "5 combos" is displayed in the dedicated item object IO2 in FIG. 13B.

Returning to the flowchart in FIG. 10, when the input of the item does not satisfy the combo condition, the server 10 displays the regular item object, returns to step S100, and then waits for the next input of an item again.

On the other hand, when the input of the item satisfies the combo condition, the server 10 displays the dedicated item object for combos, and then updates the combo information and the fever gauge value (step S145). Specifically, the combo information (i.e., the number of combos and the combo history) and the fever gauge value for the corresponding distribution in the distribution information table 412 are updated. At the update of the combo information, the number of combos is increased by one and the information related to the present input of the item (e.g., the combination of the viewer and the inputted item) is added to the combo history. At the update of the fever gauge value, an additional value, which is set based on the number of coins required to input the item this time and the updated number of combos, is added to the fever gauge value. The additional value increases as the number of coins required to input the item or the number of combos increases. When the fever gauge value is updated, the display of the fever gauges 73 of the distributor screen 70 and the display of the fever gauges 83 of the viewer screen 80 are also updated.

When the updated fever gauge is not full (i.e., the updated fever gauge value does not reach the maximum value) (NO in step S150), the server 10 then returns to step S100 and then waits for the next input of an item again.

As described above, when the combo clearing condition is satisfied during the period of waiting for an input of items (YES in step S105), the server 10 clears the one or more existing combos (step S110). The clearing of combos will be explained below. The combo clearing condition in this example is that one of the following two conditions is satisfied.
(I) The elapsed time from the generation of the last combo reaches 30 seconds.
(II) The fever gauge is full.
When either of these two conditions is satisfied, the one or more existing combos are cleared. Specifically, the combo information (the number of combos and the combo history) for the corresponding distribution is cleared (initialized) in the distribution information table 412. In this example, the chainable period can be said to be the "period within 30 seconds from the generation of the last combo".

On the other hand, when the fever gauge becomes full (i.e., the fever gauge value reaches the maximum value) through the repeated generation and chaining of combos (YES in step S150), the server 10 displays the fever time instruction screen on the distributor terminal 30 (step S155), returns to step S100, and waits for the next input of an item again.

Figure 14:
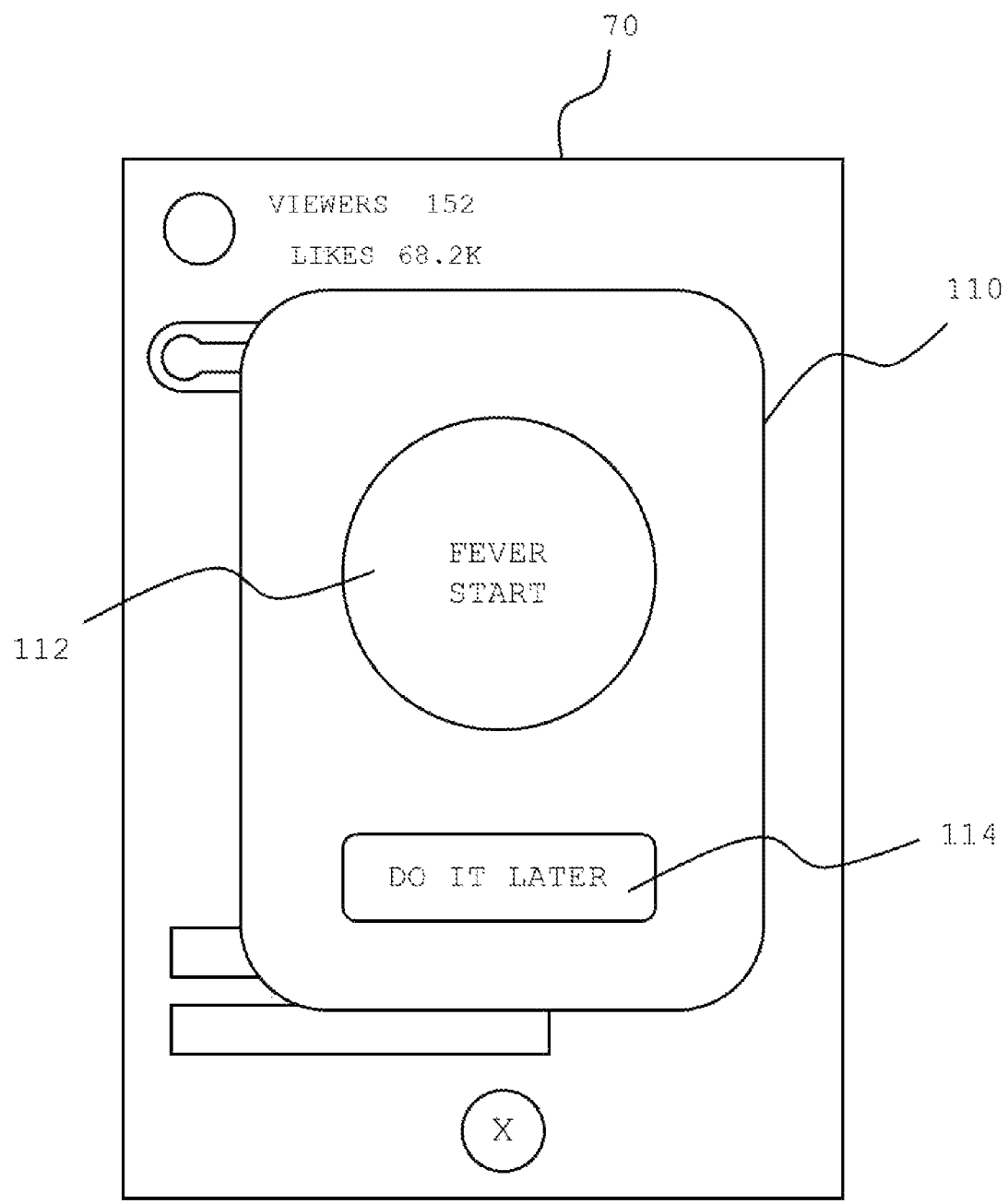
FIG. 14 illustrates a fever time instruction screen 110.

FIG. 14 illustrates a fever time instruction screen 110 displayed on the distributor terminal 30. The screen 110 is superimposed on the distributor screen 70 and has, as illustrated, a circular fever time button 112 labeled "FEVER START" and a pending button 114 labeled "DO IT LATER". When a distributor selects the fever time button 112, the fever time mode starts.

When the fever time mode starts, a predetermined visual effect (for example, an animation effect in which the characters of "FEVER" moves as if dancing) is added to the video display area 71 of the distributor screen 70 and the video display area 81 of the viewer screen 80. During the fever time mode, the fever score increases according to an input of a comment, a "like", and an item by each viewer. As described above, the fever score is managed in the distribution information table 412. During the fever time mode, the number of comments, the number of "likes", and the item points are also continuously updated based on the input of a comment, a "like", and an item by each viewer. In other words, the fever time mode is a mode in which, the fever score increases, as well as the number of comments, the number of "likes", and the item points. The fever time mode may be configured as a mode in which a dedicated item for the fever time mode can be inputted, in addition to, or instead of, the regular item that can be inputted via the item selection screen 90.

In this example, the fever time mode ends when the elapsed time from the start of the fever time mode reaches a predetermined time (e.g., 60 seconds). Upon the end of the fever time mode, the fever gauge value and the one or more existing combos are cleared (initialized). When the fever gauge becomes full again, the fever time instruction screen 110 is displayed again and then the fever time mode can be started. The difficulty of filling of the fever gauge may be increased (e.g., the maximum value of the fever gauge can be increased) as the number of times the fever gauge becomes full increases. In addition, the limit on the number of times the fever gauge becomes full in a unit period (e.g., one day) for each distributor may be set. In other words, the number of times of the fever time mode may be limited.

In this example, when a distributor selects the pending button 114 on the fever time instruction screen 110, the start of the fever time mode is suspended. During the suspension period, viewers can input items. However, the fever gauge has already been full (i.e., the condition 5 is not satisfied) and thus the combo condition is not satisfied (no combo generates) during the suspension period. During the suspension period, the distributor can instruct the start of the fever time mode at the desired timing such as a timing when an influential viewer starts viewing.

As described above, when a distributor selects the distribution stop button 76 on the distributor screen 70, the distribution of the live video ends. When the distribution of the live video ends, the server 10 sets the distribution points for the distribution. In this example, the basic points are calculated based on the number of viewers (maximum value), the number of "likes", the number of comments, and the item points. The distribution points are calculated by adding the fever score acquired during the fever time mode to the basic points. The basic points are increased as the number of viewers (maximum value), the number of likes, the number of comments, and the item points increase. The calculated basic points and the distribution points are set in the distribution information table 412.

The fever gauge value managed in the user information table 411 is kept even after the distribution of the live video ends. In other words, the fever gauge value (i.e., the status of the fever gauge) is carried over to the next distribution. The fever gauge value may be cleared (initialized) at a predetermined timing (e.g., the middle of every night), in this example.

Figure 15:
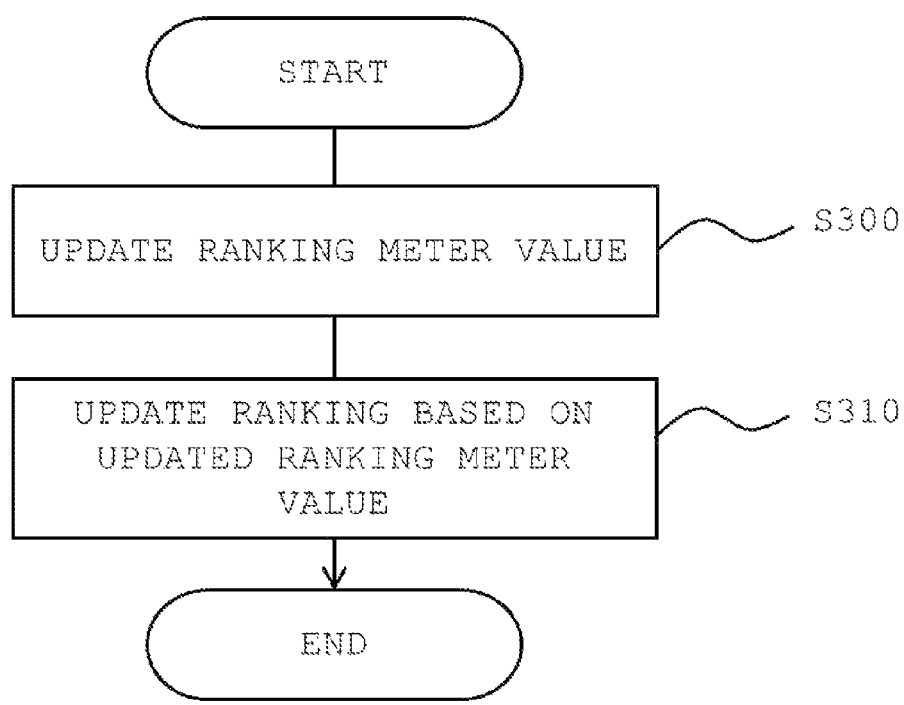
FIG. 15 is a flowchart illustrating a process executed by the server 10 for updating a ranking of each user.

In this example, a ranking on the day is determined (updated) based on the distribution points acquired by a user on the previous day. FIG. 15 is a flowchart illustrating the process executed by the server 10 for updating a ranking of each user. The process is executed in the middle of every night (for example, daily at 3 o'clock).

As illustrated, the server 10 updates a ranking meter value of each user (step S300). FIG. 16 is a diagram illustrating a rule for updating the ranking meter value. As illustrated, in this example, the ranking meter value fluctuates based on a rating of distribution points acquired by a user on the previous day within a ranking band to which the user belongs. The distribution points acquired by a specific user on the previous day is calculated by referring to the distributor user account, the distribution date and time, and the distribution points in the distribution information table 412. When the user performs several distributions on the same day, the distribution points acquired in these distributions are added together.

Specifically, as illustrated in FIG. 16, when a rating of the distribution points within the ranking band is included in the top 10%, the fluctuation in ranking meter value is "+2" (the increase of two points) in the rule for updating a ranking meter value. Similarly, the fluctuation when a rating is included in the top 11 to 30% (remaining 20% after subtracting the top 10% from the top 30%) is "+1", the fluctuation when a rating is included in the middle 30% (top 31 to 60%) is "±0" (no increase or decrease), and the fluctuation when a rating is included in the bottom 40% is "−1" (the decrease of one point). When no distribution is performed on the previous day, the fluctuation in ranking meter value is "−1" regardless of a rating within the ranking band.

In step S300, the ranking meter value of each user is updated in accordance with the update rule illustrated in FIG. 16. When a user has the ranking meter value that is negative and the fluctuation in ranking meter value this time is the increase (specifically, +2 or +1), the ranking meter value may be cleared to zero and then increased from there. For example, when a user's current value of the ranking meter value is "−1" and the fluctuation this time of the user is "+2", the ranking meter value is cleared to zero and then increased by two. Thus, the ranking meter value after the fluctuation is "+2" (not "+1"). In this way, even when a user has the ranking meter value that is negative (for example, a user with a low distribution frequency), the ranking meter value can be increased all at once, which may promote the distribution of live videos.

After updating the ranking meter value for each user, the server 10 updates the ranking based on the updated ranking meter value (Step S310). FIG. 17 is a diagram illustrating a correspondence relationship between the ranking update details and the necessary ranking meter values. As illustrated, the ranking meter value needed for a user to move up in ranking to another ranking band (that is, to move up in ranking from the highest ranking in each ranking band) is +4. In other words, a user belonging to the highest ranking (for example, A+) in each ranking band moves up in ranking to the lowest ranking (for example, S−) in a one level higher ranking band when the ranking meter value reaches +4. Further, the ranking meter value needed for a user to move up in ranking within the same ranking band (that is, to move up in ranking from the middle or lowest ranking in each ranking band) is +2. In other words, a user belonging to the middle or lowest ranking (for example, B or B−) in each ranking band moves up in ranking to a one level higher ranking (for example, B+ or B) within the same ranking band when the ranking meter value reaches +2.

Similarly, as illustrated in FIG. 17, the ranking meter value needed for a user to move down in ranking within the same ranking band (that is, to move down in ranking from the highest or middle ranking within each ranking band) is −2. In other words, a user belonging to the highest or middle ranking (for example, B+ or B) in each ranking band moves down in ranking to a one level lower ranking (for example, B or B−) within the same ranking band when the ranking meter value reaches −2. Further, the ranking meter value needed for a user to move down in ranking to another ranking band is −6. In other words, a user belonging to the lowest ranking (for example, A−) in each ranking band moves down in ranking to the highest ranking (for example, B+) within a one level lower ranking band when the ranking meter value reaches −6. In this way, the absolute value of the necessary ranking meter value for moving up or down in ranking to another ranking band is larger than that for moving up or down in ranking within the same ranking band, in this example. This can reduce moving up or down abruptly in ranking within a short period.

In step S310, the ranking is updated based on the ranking meter value in accordance with the correspondence relationship illustrated in FIG. 17. The ranking meter value of a user whose ranking has been updated (the user whose ranking has increased or decreased) is cleared to zero.

Figure 18:
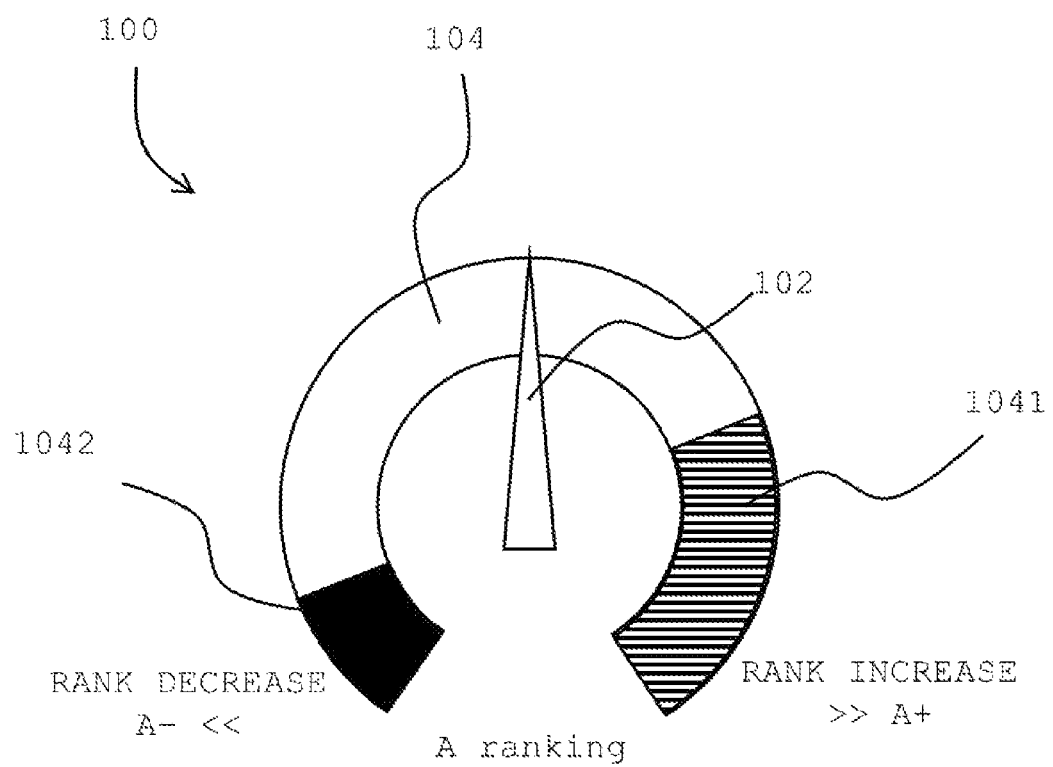
FIG. 18 illustrates a ranking meter object 100.

FIG. 18 illustrates a ranking meter object 100 displaying the ranking meter value of a user. The object 100 is located, for example, on a profile screen that displays the basic information related to a user. As illustrated, the ranking meter object 100 has a needle object 102 having a needle shape, and a scale object 104 having a "C" shape that opens downward. The current ranking of the user ("A ranking" in the FIG. 18) is displayed below the needle object 102. The needle object 102 is configured to swing (rotate) to the right as the ranking meter value increases, and to swing to the left as the ranking meter value decreases. The needle object 102 in FIG. 18 is in an upright position (pointing in the direction of 12 o'clock), which corresponds to the ranking meter value of zero. The needle object 102 inclines to the right as the ranking meter value increases in the positive direction, and to the left as the ranking meter value decreases in the negative direction. The scale object 104 has a rank-increase area 1041 corresponding to the ranking meter value needed for an increase in ranking on the lower right part of the object 104 and has a rank-decrease area 1042 corresponding to the ranking meter value needed for a decrease in ranking on the lower left part of the object 104. The scale object 104 may allow a user to know the status of the ranking meter value that is headed toward a higher or lower ranking.

Figure 19:
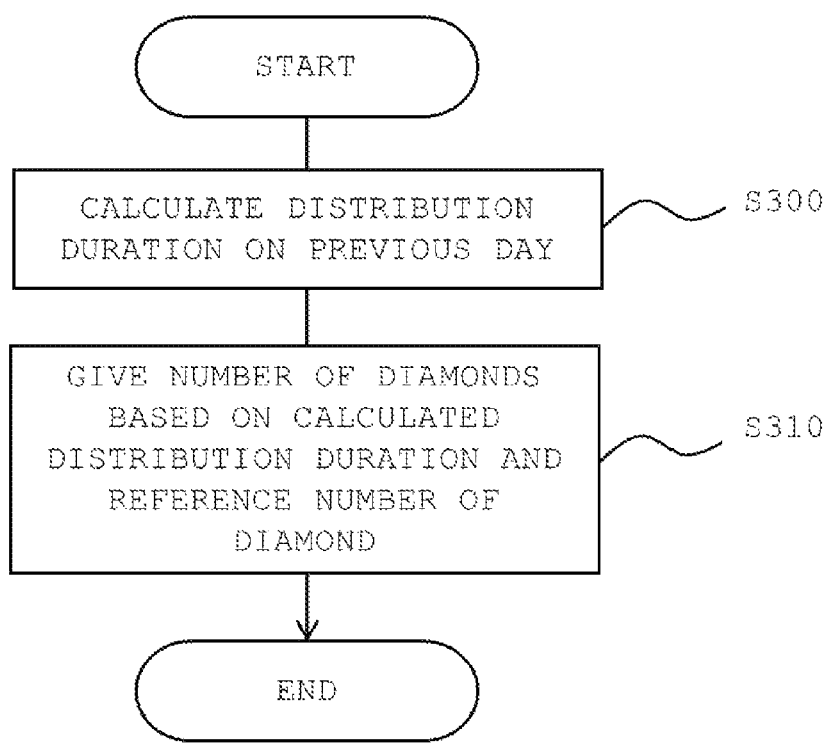
FIG. 19 is a flowchart illustrating a process executed by the server 10 for giving a diamond to each distributor.

In this example, the virtual diamond as a reward is given to the user as a distributor based on the distribution duration and the ranking on the previous day. FIG. 19 is a flowchart illustrating the process executed by the server 10 for giving a diamond to each distributor. This process is executed in the middle of every night, and is, for example, executed at a certain time before the process executed for updating the ranking of each user (for example, daily at 0 o'clock), which is illustrated in FIG. 15.

As illustrated, the server 10 calculates the distribution duration on the previous day of each user (step S400). Specifically, the distribution duration on the previous day of a specific user is specified by referring to the distributor user account, the distribution date and time, and the distribution duration in the distribution information table 412. When a user performs several distributions on the same day, the distribution durations of these distributions are added together.

The server 10 then gives diamonds to each user based on the calculated distribution duration and the reference number of diamonds (step S410). Specifically, the number of diamonds to be given to each user is obtained by multiplying the calculated distribution duration by the reference number of diamonds. The reference number of diamonds is preset for each ranking to increase with a higher ranking, and the reference number of diamonds corresponding to the ranking on the previous day of each user is applied. When the diamonds are given to the user, the number of held diamonds in the user information table 411 is updated. In this example, the diamonds can be exchanged for coins or real currency.

In the example described above, the fever gauge value increases upon the generation or chaining of combos, the fever time mode can be started when the fever gauge is full, and the fever score acquired during the fever time mode is added to the distribution points. Such a design is just an example, and other designs may be applied in other examples of the present embodiment. For example, in another example according to the present embodiment, the distribution points may directly increase upon the generation or chaining of combos. Further, the benefit given to the distributor upon the generation or chaining of combos is not limited to the fever gauge value and the distribution points. In yet another example of the present embodiment, the benefit may be the coins or diamonds.

The video distribution server 10 according to the present embodiment described above generates a combo when an input of an item by each of a plurality of viewers of a live video satisfies the predetermined combo condition, which may encourage communication among the viewers of the live video. In addition, the first benefit (e.g., fever gauge value) is given to the distributor upon the generation of a combo, which may strengthen the relationship between the distributor and the viewers of the live video.

The processing and procedures described in the specification may be achieved by software, hardware, or any combination of these in addition to what was explicitly described. For example, the processing and procedures described in the specification may be achieved by implementing a logic corresponding to the processing and procedures in a medium such as an integrated circuit, a volatile memory, a non-volatile memory, and a magnetic disk. Further, the processing and procedures described in the specification can be implemented as a computer program corresponding to the processing and procedures and can be executed by various kinds of computers.

Although the processing and procedures described in the specification are described as being executed by a single device, a single piece of software, a single component, or a single module, such processing or procedures can be executed by a plurality of devices, a plurality of pieces of software, a plurality of components, and/or a plurality of modules. Further, the software and hardware elements described in the specification can also be achieved by integrating them into fewer components or breaking them down into more components.

In the specification, when a component of the present disclosure is described as either one or a plurality of things, the component may be either one or a plurality of things, except when the context indicates otherwise.

The invention claimed is:

1. A system, comprising one or more computer processors that execute machine-readable instructions to perform:
   distributing a live video provided by a distributor to a plurality of viewers;
   receiving an input of an item by each of the plurality of viewers during a distribution of the live video;
   determining, in response to receiving a first input of a first item by a first viewer included in the plurality of viewers, whether the first input satisfies a predetermined combo condition;
   generating a combo in response to determining that the first input satisfies the predetermined combo condition;
   chaining the combo to a last combo, generated immediately before, in response to the first input being received within a chainable period, wherein the chainable period starts upon generating the last combo and ends when a predetermined time elapses from generating the last combo without an occurrence of chaining the combo; and
   giving, in response to generating the combo, one or more first benefits to the distributor based on a number of chained combos, wherein a number of the first benefits given to the distributor increases as the number of chained combos increases.

2. The system of claim 1,
   wherein the predetermined combo condition includes a condition that a relationship between a value of the first item and a value of a second item inputted before the first item is a predetermined relationship, and
   the second item includes an item inputted immediately before the first item or an item inputted when the last combo is generated.

3. The system of claim 1,
   wherein the predetermined combo condition includes a condition that the number of times the same item is inputted in a plurality of chained combos is less than or equal to a threshold value.

4. The system of claim 1,
   wherein the predetermined combo condition includes a condition that the number of times any item is inputted by the same viewer in a plurality of chained combos is less than or equal to a threshold value.

5. The system of claim 1,
   wherein the one or more computer processors further perform:
   giving the distributor a second benefit during the distribution, the number of the second benefits to be given to the distributor being set based at least on a viewing status of the plurality of viewers; and
   starting, on a condition that the number of the first benefits held by the distributor is equal to or greater than a threshold value, a predetermined mode in which the number of the second benefits to be given to the distributor is enhanced.

6. The system of claim 5, wherein the starting of the predetermined mode includes starting the predetermined mode in response to an instruction by the distributor after the number of the first benefits held by the distributor reaches the threshold value.

7. The system of claim 5, wherein the one or more computer processors further perform enabling an input of a dedicated item for the predetermined mode by each of the plurality of viewers in response to starting the predetermined mode.

8. The system of claim 1, wherein the one or more computer processors further perform clearing one or more existing combos upon an expiration of the chainable period.

9. A method executed by one or more computers, the method comprising:
distributing a live video provided by a distributor to a plurality of viewers;
receiving an input of an item by each of the plurality of viewers during a distribution of the live video;
determining, in response to receiving a first input of a first item by a first viewer included in the plurality of viewers, whether the first input satisfies a predetermined combo condition;
generating a combo in response to determining that the first input satisfies the predetermined combo condition;
chaining the combo to a last combo, generated immediately before, in response to the first input being received within a chainable period, wherein the chainable period starts upon generating the last combo and ends when a predetermined time elapses from generating the last combo without an occurrence of chaining the combo; and
giving, in response to generating the combo, one or more first benefits to the distributor based on a number of chained combos, wherein a number of the first benefits given to the distributor increases as the number of chained combos increases.

10. A non-transitory computer-readable medium including a program, wherein the program causes one or more computers to execute:
distributing a live video provided by a distributor to a plurality of viewers;
receiving an input of an item by each of the plurality of viewers during a distribution of the live video;
determining, in response to receiving a first input of a first item by a first viewer included in the plurality of viewers, whether the first input satisfies a predetermined combo condition;
generating a combo in response to determining that the first input satisfies the predetermined combo condition;
chaining the combo to a last combo, generated immediately before, in response to the first input being received within a chainable period, wherein the chainable period starts upon generating the last combo and ends when a predetermined time elapses from generating the last combo without an occurrence of chaining the combo; and
giving, in response to generating the combo, one or more first benefits to the distributor based on a number of chained combos, wherein a number of the first benefits given to the distributor increases as the number of chained combos increases.

* * * * *